Patented Jan. 15, 1952

2,582,849

UNITED STATES PATENT OFFICE 2,582,849

PHENYLENE DIAMINE-FORMALDEHYDE RESIN PREPARATION

Dirk Ramondt, Bloemendaal, Netherlands, assignor to N. V. Octrooien Maatschappij "Activit," Amsterdam, Netherlands No Drawing. Application December 26, 1947, Serial No. 794,079. In the Netherlands July 28, 1942

Section 1, Public Law 690, August 8, 1946
Patent expires July 28, 1962

3 Claims. (Cl. 260—72.5)

For the last few years the use of synthetic resins as ion exchangers for anion exchange, as well as for cation exchange, is well known, as is shown, for example, in United States Patents Nos. 2,104,501, 2,151,883, 2,191,853 and 2,198,874, whereas later it has also been suggested to use synthetic resins for the purification of liquids particularly for the improvement of color and taste, as shown, e. g., in application Serial No. 634,402, filed December 11, 1945. In all these cases the synthetic resins are used, as a rule, in the form of grains as filtering material in percolators in order to bring the synthetic resins with a large surface into contact with the liquid. However, these grains should not be too small, as then the filter resistance becomes too large, and part of the grains is rinsed away during the process. As a rule, the size of the grain chosen is between 3 and 0.25 mm. In order to reduce the filter resistance, a regular form and size of the grains is also required.

As the active synthetic resins are condensation or polymerization products, more or less large pieces are obtained in the manufacture, which pieces have to be pulverized by breaking, grinding or planing. It is very difficult to obtain a regular grain, and generally, a quantity of powder is obtained which is undesirable for filtering purposes. Also, a regular form and size of grain is not readily obtained in this case.

For the above reasons, it is obvious that it would offer many advantages if the synthetic resin could be obtained in a simple way whereby an expensive operation and loss of material could be avoided, and whereby, furthermore, the form of the grains would be quite regular.

Applicant has now found that the above result can be reached if care is taken that the condensation or polymerization takes place while the liquid, out of which the synthetic resin arises, is in the form of a drop. For this purpose, the aforementioned liquid is preferably cooled to a temperature at which there is little or no condensation, and the liquid is then introduced in drop form into a medium of so much higher temperature that condensation or polymerization takes place in the drops, after which the grains of synthetic resin are obtained in drop form. The drop form may be obtained by having the liquid flow out of small openings. The liquid may be allowed to flow by gravity or forced out under pressure, and may be sprayed in any one of the well known manners. In this way, obtaining the exact size of the drops formed is insured.

The warmer medium, in which the condensation or polymerization takes place, may be a gas, e. g., air, as well as a liquid. When a liquid medium is used, one has to take care, preferably by choice of the liquid, that this liquid and the drops do not mix, and that none of the components of the drops will dissolve in the liquid.

If one is dealing with a mixture that only after a certain time condenses, a result can also be obtained without a difference in temperature before and after the liquid out of which the resin arises is brought into drop form, but as a rule, a difference in temperature will be necessary in order to avoid untimely condensation, which can take place too early as well as too late.

An example of the process is given below.

Example 100 grams of meta-phenylene diamine, 450 grams of a solution of hydrochloric acid (5%) and 160 grams of formaldehyde (40%) are mixed in a vessel which is kept at 0° C. by cooling. At the lower part of this vessel, the liquid drops through small tubes into a high vessel which is filled with toluol, and which is kept at a temperature of about 80° C. by a warm water jacket around the upper part of the vessel. The lower part of the vessel is kept at a temperature of about 5° C. by cooling.

The drops of liquid which fall into the toluol condense immediately in the vessel. By the cooling of the lower part of the vessel, sticking together of the grains is avoided. The grains formed are scooped out of the vessel at regular intervals, and are then hardened in the usual way with the aid of lye, if they are to be used for decolorizing purposes, and can be dried with care, if they are to be applied exclusively for anion exchange.

The grains obtained are practically equal in form and size, and are an excellent filtering material.

The process is useful in all those cases in which a regular form of grain of the synthetic resins is desirable. Thus, it is applicable to the manufacture of any resinous ion exchanger, either cation exchangers or anion exchangers. It may, therefore, be used in the manufacture of anion exchangers which employ amino compounds, other than meta-phenylene diamine, including the alkylene polyamines, such as ethylene diamine, triethylene tetramine, hexamethylene diamine, tetraethylene pentamine, guanidine, biguanide, guanyl urea, substituted guanidines, substituted biguanides, substituted guanyl ureas, etc. These may be used in the form of the free bases or as the soluble salts, such as the hydrochlorides, nitrates, carbonates, etc. Furthermore, they may be used alone or in admixture with insolubilizing amino compounds, such as urea, thiourea, the aminotriazines, including melamine, the mono-, di- and tri-phenyl melamines, acetoguanamine, the mono-, di- and tri-ethyl melamines, etc. Condensation products may be prepared where part or all of the formaldehyde is replaced with other aldehydes, including furfural, acetaldehyde, crotanaldehyde, heptaldehyde, etc. Ketones, such as acetone, may be used in addition to the formaldehyde in some cases with desirable results.

In the manufacture of cation exchangers, sulfonated phenol, sulfonated naphthalene and sulfonated polyhydric phenols may be condensed with formaldehyde. Furthermore, formaldehyde condensation products of phenol itself, as well as other phenols, may be reacted with sulfites or bisulfites to produce cation exchangers. Ketone sulfonates may also be resinified by reaction with formaldehyde and other aldehydes, such as furfural.

The foregoing may be formed into drops in a liquid medium at any desired stage in the condensation or polymerization where still in liquid form. With highly reactive substances, such as meta-phenylene diamine and formaldehyde, the reactants may be added as an unreacted mixture or as simple addition products. When the components are less reactive, they may be condensed or polymerized to the desired degree before forming into drops and subjecting to a liquid medium for further condensation and/or polymerization.

Since all the foregoing condensation products are usually prepared in aqueous media, they are usually formed into drops in or dropped into a water-immiscible organic liquid medium, such as toluene. The chemical constitution of the water-immiscible liquid medium is of no real importance so long as it is inert to the resin and the reactants, if the latter are introduced into the medium prior to condensation. Accordingly, a wide variety of organic liquids may be employed, including benzol, the xylenes, petroleum fractions, carbon tetrachloride, ethylene dichloride, etc., the selection being made in accordance with the aforementioned rule regarding the solubility of the resin or resin-forming substances introduced into the liquid medium. The specific gravity of the liquid medium should be less than that of the liquid out of which the resin arises if the latter is dropped into the liquid, but may be higher if the latter is fed at a suitable distance below the surface of a body of the liquid medium in which case the drops will rise to the surface instead of settling as in the example given above.

I claim:

1. A process for the manufacture of an ion exchange resin which comprises dropping in the form of drops an acidic aqueous mixture of meta-phenylene diamine and formaldehyde into toluol, said mixture being kept at about 0° C. and said toluol being kept at about 80° C.

2. A process for the manufacture of an ion exchange resin which comprises dropping in the form of drops an acidic aqueous mixture of meta-phenylene diamine and formaldehyde into a warmer immiscible liquid maintained at a temperature sufficient to cause polymerization of said mixture.

3. A process for the manufacture of an ion exchange resin which is water insoluble which comprises dropping in the form of drops an acidic aqueous liquid containing meta-phenylene diamine and formaldehyde, which liquid is maintained at a temperature lower than that sufficient to cause polymerization, into a warmer immiscible liquid maintained at a temperature sufficient to cause polymerization of said acidic aqueous liquid and then passing the resulting polymerized drops through a portion of said immiscible liquid maintained at a temperature lower than that sufficient to cause polymerization.

DIRK RAMONDT.

REFERENCES CITED

The following references are of record in the file of this patent:

UNITED STATES PATENTS

| Number | Name | Date |
|---|---|---|
| 1,111,284 | Aylsworth | Sept. 22, 1941 |
| 2,133,257 | Strain | Oct. 11, 1938 |
| 2,326,078 | Trommsdorff | Aug. 3, 1943 |
| 2,340,111 | D'Alelio | Jan. 25, 1944 |
| 2,366,007 | D'Alelio | Dec. 26, 1944 |
| 2,366,008 | D'Alelio | Dec. 26, 1944 |
| 2,367,661 | Agre | Jan. 23, 1945 |
| 2,384,945 | Marisic | Sept. 18, 1945 |
| 2,384,946 | Marisic | Sept. 18, 1945 |
| 2,409,441 | Metzger | Oct. 15, 1946 |
| 2,466,675 | Bauman | Apr. 12, 1949 |
| 2,500,149 | Boyer | Mar. 14, 1950 |
| 2,518,420 | Evers | Aug. 8, 1950 |
| 2,521,288 | Evers | Sept. 5, 1950 |

OTHER REFERENCES

Meyers Ind. and Eng. Chem., vol. 33, pp. 697–706, June 11, 1941.

Bauman, Jour. Amer. Chem. Soc., vol. 69, pp. 2830–2836.

Kraemer, Advances in Colloid Science, page 321, Jan. 28, 1942, Interscience Publishers, Inc., New York.